US008617017B2

(12) United States Patent
Tada et al.

(10) Patent No.: US 8,617,017 B2
(45) Date of Patent: Dec. 31, 2013

(54) POWER TRANSMISSION CHAIN

(75) Inventors: Seiji Tada, Kashiba (JP); Shigeo Kamamoto, Kashiwara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 349 days.

(21) Appl. No.: 12/734,506

(22) PCT Filed: Nov. 7, 2008

(86) PCT No.: PCT/JP2008/070327
§ 371 (c)(1),
(2), (4) Date: May 6, 2010

(87) PCT Pub. No.: WO2009/060946
PCT Pub. Date: May 14, 2009

(65) Prior Publication Data
US 2010/0248881 A1 Sep. 30, 2010

(30) Foreign Application Priority Data
Nov. 7, 2007 (JP) ................................. P2007-289770

(51) Int. Cl.
*F16G 13/04* (2006.01)
(52) U.S. Cl.
USPC ......................................... 474/215; 474/237
(58) Field of Classification Search
USPC ......... 474/148, 237, 202, 206, 212, 215, 216, 474/217, 229
See application file for complete search history.

(56) References Cited

U.S. PATENT DOCUMENTS

| 7,882,689 | B2* | 2/2011 | Tada et al. ..................... 59/35.1 |
| 2004/0152549 | A1 | 8/2004 | Nishimoto et al. |
| 2005/0187057 | A1* | 8/2005 | Lou ............................... 474/245 |
| 2007/0087883 | A1 | 4/2007 | Tada et al. |
| 2008/0015070 | A1* | 1/2008 | Miura ........................... 474/155 |
| 2008/0196381 | A1* | 8/2008 | Tada et al. ..................... 59/35.1 |
| 2009/0233745 | A1 | 9/2009 | Tada et al. |
| 2010/0035713 | A1* | 2/2010 | Miura et al. .................. 474/206 |
| 2010/0279805 | A1* | 11/2010 | Kamamoto et al. .......... 474/148 |
| 2011/0003658 | A1* | 1/2011 | Tada et al. ..................... 474/148 |

FOREIGN PATENT DOCUMENTS

| JP | 2004-232810 | 8/2004 |
| JP | 2006-226451 | 8/2006 |
| JP | 2007-107634 | 4/2007 |

(Continued)

*Primary Examiner* — Sang Kim
*Assistant Examiner* — Juan Campos, Jr.
(74) *Attorney, Agent, or Firm* — McGinn IP Law Group, PPLC

(57) ABSTRACT

The invention provides a power transmission chain in which abnormal noise can be reduced.
In a link, a front through hole 7 and a rear through hole 8 aligned in a chain traveling direction X are provided. A pillar portion 9 is provided between the front through hole 7 and the rear through hole 8. Projecting portions 26, 29 are provided at a central portion in a height direction V of the pillar portion 9, and concave curve portions 27, 28, 30, 31 are provided at both end portions. A pair of flat portions (33,34 and 38,39) are provided on each projection portion 26,29 for restricting an overshoot of the chain. A not-shown pin that is loosely fitted to each of the front through hole 7 and the rear through hole 8 is brought into abutment with corresponding flat portions 27,28,30,31 to restrict an overshoot of the chain 1.

10 Claims, 8 Drawing Sheets

(56) References Cited

FOREIGN PATENT DOCUMENTS

| JP | 2007-107635 | 4/2007 |
| JP | 2007-107668 | 4/2007 |
| JP | 2007-255621 | 10/2007 |
| WO | WO 2007/043618 A1 | 4/2007 |

* cited by examiner (a)

(b)

POWER TRANSMISSION CHAIN

TECHNICAL FIELD

The present invention relates to a power transmission chain.

BACKGROUND ART

In endless power transmission chains for use in continuously variable pulley transmissions (CVT: Continuously Variable Transmission) for motor vehicles, there is, for example, a power transmission chain in which links lying adjacent in a chain traveling direction are connected by pins and inter-pieces which can move in an oscillating fashion relative to each other (for example, refer to Patent Document 1).

In the links according to Patent Document 1, a pair of through holes is formed which is arranged in the chain traveling direction, and a pillar portion is provided between the pair of through holes. A pin is fixedly press fitted while an inter-piece is loosely fitted in one of the through holes and a pin is loosely fitted while an inter-piece is fixedly press fitted in the other through hole. The pin and the inter-piece which are loosely fitted in the corresponding through holes are disposed on sides of the corresponding through holes which face the pillar portion.

The pin and the inter-piece which are fitted in the same through hole make an oscillating motion relative to each other as the adjacent links turn relative to each other. The turning of the adjacent links is restricted to a predetermined angle by the pin and inter-piece which are loosely fitted in the corresponding through holes being brought into abutment with the pillar portions.

Patent Document 1: JP-A-2006-226451

DISCLOSURE OF THE INVENTION

Problem that the Invention is to Solve

In the power transmission chain described in Patent Document 1 above, however, there is a fear that abnormal noise is generated when the turning between the adjacent links is restricted. Namely, when the turning of the adjacent links is restricted, the pin and inter-piece which are loosely fitted in the corresponding through holes come to collide with the pillar portion, causing a fear that abnormal noise is generated by the collision.

The invention has been made in these background situations, and an object thereof is to provide a power transmission chain which can reduce such abnormal noise.

Means for Solving the Problem

With a view to attaining the object, according to the invention, there is provided a power transmission chain (1, 101) comprising a plurality of links (2, 102a, 102b) and a plurality of connecting members (3) for connecting these links so that the links turn relative to each other, wherein each connecting member includes a first power transmission member (10) having pulley engaging power transmission portions (16a, 17a) at a pair of end portions (16, 17), respectively, and a second power transmission member (11) which makes a pair with the first power transmission member, each link includes first and second through holes (7, 8) which are aligned in a chain traveling direction (X), a first power transmission member is fitted so that a relative movement is enabled while a second power transmission member is fitted so that a relative movement is restricted in the first through hole and a first power transmission member is fitted so that a relative movement is restricted while a second power transmission member is fitted so that a relative movement is enabled in the second through hole, each of a pair of side portions (24, 25, 124, 125) of a pillar portion (9, 109) which separates the first and second through holes from each other in each link includes a projecting portion (26, 29, 126, 129) which projects towards the corresponding through hole side at a central portion in a height direction (V) of the pillar portion and a pair of concave curve portions (27, 28, 30, 31, 127, 128, 130, 131) which is disposed so as to hold therebetween the projecting portion with respect to the height direction of the pillar portion, and a flat portion (33, 34, 38, 39) is formed on each of a pair of inclined surfaces (32, 37) which hold therebetween an apex portion (26a, 29a) of the projecting portion on each side portion of the pillar portion so as to be brought into abutment with a corresponding surface (13a, 13b, 18a, 18b) of the corresponding power transmission member when a turning angle between the links is restricted, the flat portion and the concave curve portion being connected by a convexly curved portion (35, 36, 40, 41).

According to the invention, the turning between the links is restricted by the first and second power transmission members being brought into abutment with their corresponding flat portions. Since the flat portion is provided in proximity to the central portion in the height direction of the pillar portion, a shock resulting when each power transmission member comes into forcible contact with the flat portion can be reduced. By doing so, abnormal noise generated when the turning between the links is restricted can be reduced. In addition, the weight of the link can be reduced by providing the pair of concave curve portions on both sides of the projecting portion which hold it with respect to the height direction of the pillar portion, and the weight of the power transmission chain can eventually be reduced.

In addition, the plurality of links include a long-pitch link (102b) having a relatively long connecting pitch (P) and a short-pitch link (102a) having a relatively short connecting pitch, and radii of curvature (R5 to R8) of concave curve portions of a pillar portion of the long-pitch link may be made smaller than radii of curvature (R1 to R4) of concave curve portions of a pillar portion of the short-pitch link.

As this occurs, since the radii of curvature of the concave curve portions of the long-pitch link differs from those of the concave curve portions of the short-pitch link, the long-pitch link and the short-pitch link can visually identified based on the difference in size of the concave curve portions. By doing so, for example, an erroneous assemblage can be prevented in which the short-pitch link is disposed in a position where the long-pitch link is to be disposed. In addition, the long-pitch link can be made lighter in weight than the short-pitch link by making the radii of curvature of the concave curve portions in relation to the long-pitch link smaller than the radii of curvature of the concave curve portions in relation to the short-pitch link.

Note that in what has been described above, although numbers in the parentheses represent reference numerals denoting corresponding constituent elements in an embodiment that will be described later, there is no intention to limit the scope of claims by these reference numerals.

ADVANTAGE OF THE INVENTION

According to the invention, the turning between the links is restricted by the first and second transmission members being brought into abutment with their corresponding flat portions. The power transmission chain has an advantage of reducing a shock that would otherwise be generated when the respective power transmission members come into forcible contact with their corresponding flat portions because the flat portions are provided only in proximity to the central portion in the vertical direction of the pillar portion. By doing so, abnormal noise generated when the turning between the links is restricted can be reduced. In addition, the weight of the link can be reduced by providing the pair of concave curve portions on both the sides of the projecting portion which hold it therebetween with respect to the height direction of the pillar portion, and hence, the weight of the power transmission chain can eventually be reduced.

BEST MODE FOR CARRYING OUT THE INVENTION

Figure 1:
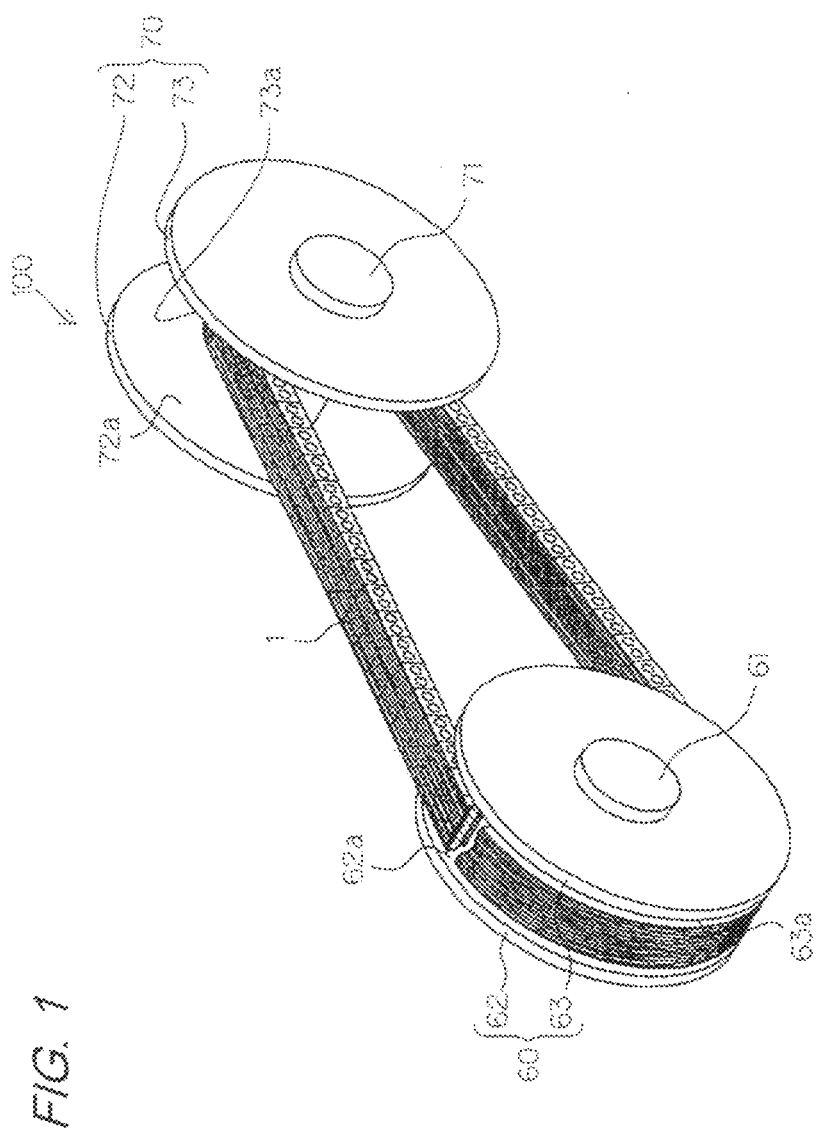
FIG. 1 A perspective view showing exemplarily the configuration of a main part of a continuously variable chain transmission as a power transmission system including a power transmission chain according to an embodiment of the invention.

Hereinafter, referring to the drawings, embodiments of the invention will be described specifically.

Figure 2:
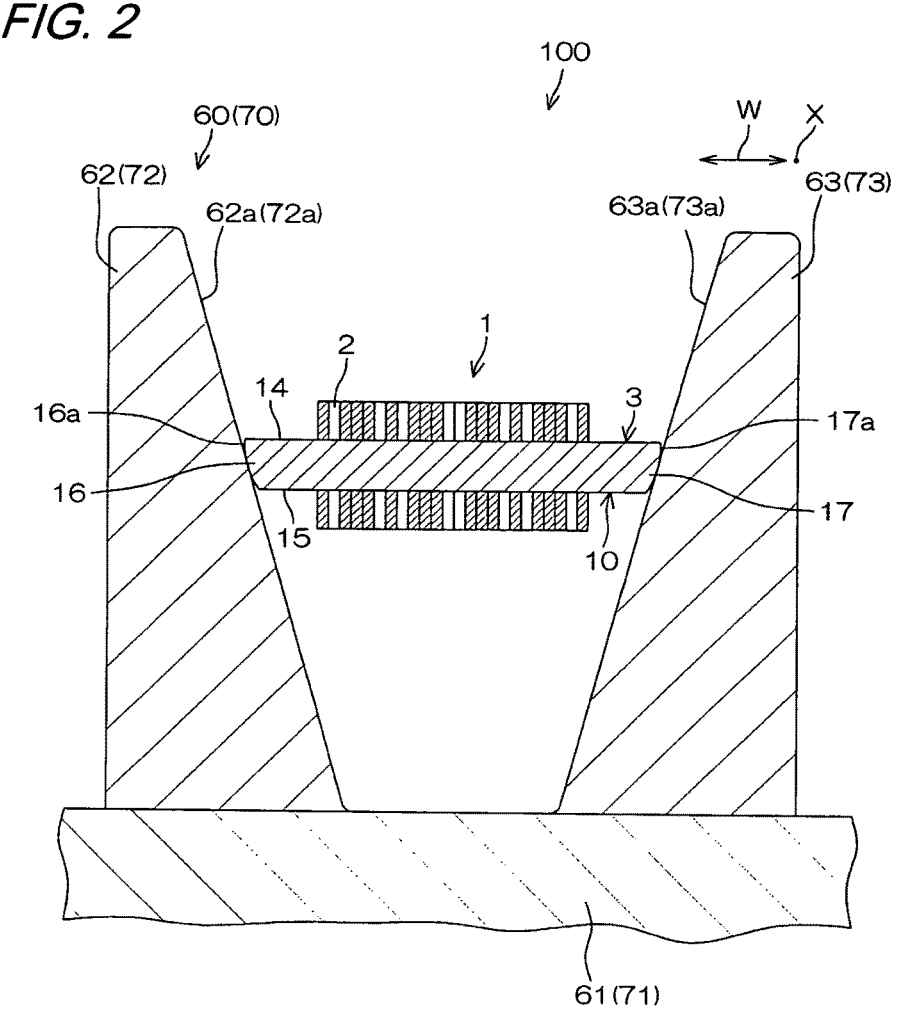
FIG. 2 A sectional view of a drive pulley (a driven pulley) and part of the power transmission chain.

FIG. 1 is a perspective view showing exemplarily the configuration of a main part of a continuously variable chain transmission 100 as a power transmission system including a power transmission chain 1 according to an embodiment of the invention. In addition, FIG. 2 is a sectional view of a drive pulley 60 (a driven pulley 70) and part of the power transmission chain 1. In FIG. 1, part of the power transmission chain 1 is shown in section.

Referring to FIG. 1, the continuously variable chain transmission 100 (hereinafter, also referred to simply as a "continuously variable transmission 100") is such as to be installed in a vehicle such as a motor vehicle and includes a drive pulley 60 as a first pulley which is made of a metal (a construction steel or the like), a driven pulley 70 as a second pulley which is made of a metal (a construction steel or the like), and an endless power transmission chain 1 (hereinafter, also referred to simply as a "chain 1") which is wound round and extended between both the pulleys 60, 70.

Referring to FIGS. 1 and 2, the drive pulley 60 is mounted integrally rotatably on an input shaft 61 which is continuously stretched to a drive source (not shown) of the vehicle so as to transmit power thereof and includes a fixed half pulley 62 and a movable half pulley 63. The fixed half pulley 62 and the movable half pulley 63 have individually half pulley surfaces 62a, 63a which make a pair and confront each other. The respective half pulley surfaces 62a, 63a each include a conically inclined surface, and a groove is defined between the half pulley surfaces 62a, 63a. The chain 1 is held under strong pressure by the pair of half pulley surfaces 62a, 63a in the groove.

In addition, a hydraulic actuator (not shown) is connected to the movable half pulley 63 for changing a width of the groove. The hydraulic actuator is designed to move the movable pulley half 63 in an axial direction (a left-right direction in FIG. 2) of the input shaft 61 to change the width of the groove when changing speeds of the continuously variable transmission 100. The chain 1 is moved in a radial direction (a vertical direction in FIG. 2) of the input shaft 61 by so changing the width of the groove so as to change an effective diameter of the drive pulley 60 with respect to the chain 1 (hereinafter, also referred to as an "effective radius of the drive pulley 60").

On the other hand, the driven pulley 70 is mounted integrally rotatably on an output shaft 71 which is continuously stretched to drive wheels (not shown) so as to transmit the power thereto as is shown in FIGS. 1 and 2. The driven pulley 70 includes a fixed half pulley 72 and a movable half pulley 73 which have individually half pulley surfaces 72a, 73a which make a pair. A groove is defined between these half pulley surfaces 72a, 73a, and the chain 1 is held under strong pressure by the pair of half pulley surfaces 72a, 73a in the groove.

The movable half pulley 73 of the driven pulley 70 is connected to a hydraulic actuator (not shown) in a similar way to the way in which the movable half pulley 63 is. The hydraulic actuator is designed to change a width of the groove to thereby move the chain 1 in a radial direction (a vertical direction in FIG. 2) of the output shaft 71 so as to change an effective diameter of the driven pulley 70 with respect to the chain 1 (hereinafter, also referred to as an "effective radius of the driven pulley 70") when changing speeds of the continuously variable transmission 100.

When a speed reduction ratio of the continuously variable transmission 100 is the highest (at the time of driving with a speed of the input shaft being faster than that of the output shaft or under-drive), the effective radius of the drive pulley 60 is the least, while the effective radius of the driven pulley 70 is the largest. On the other hand, when a speed increase of the continuously variable transmission 100 is the highest (at the time of overdrive), the effective radius of the drive pulley 60 is the largest, while the effective radius of the driven pulley 70 is the least.

Figure 3:
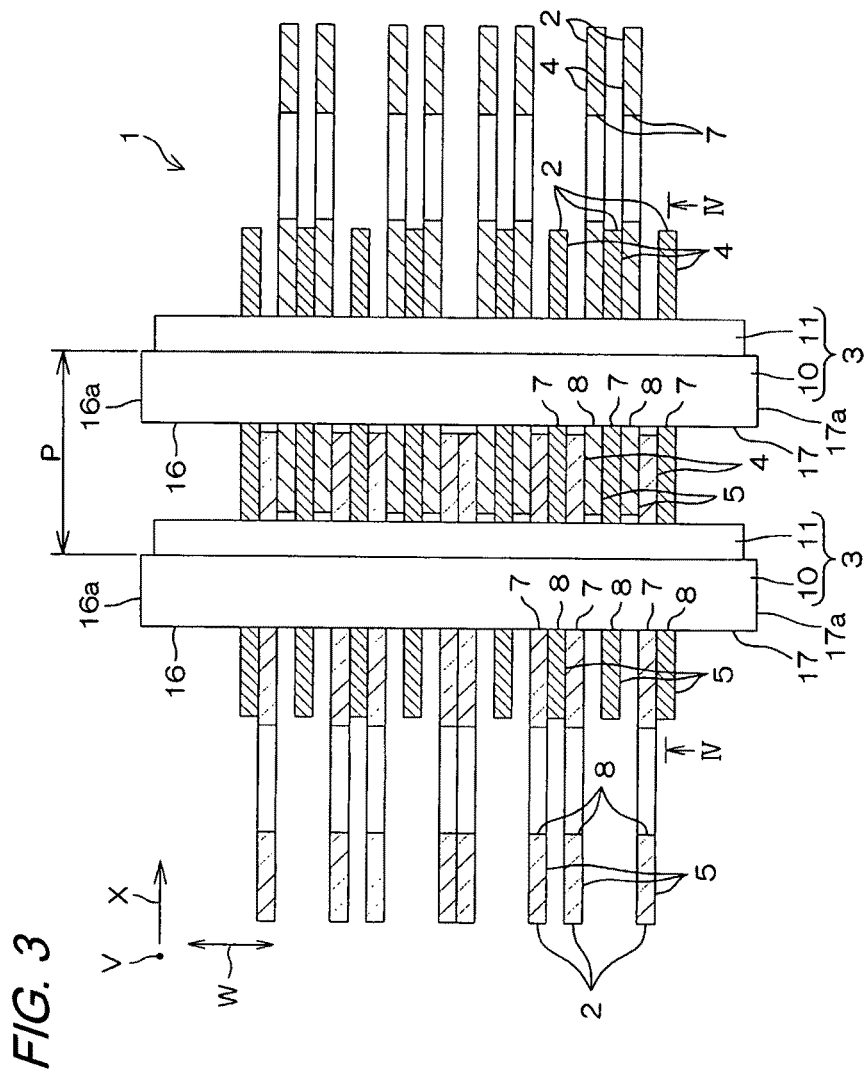
FIG. 3 A sectional view of a main part of the chain.
Figure 4:
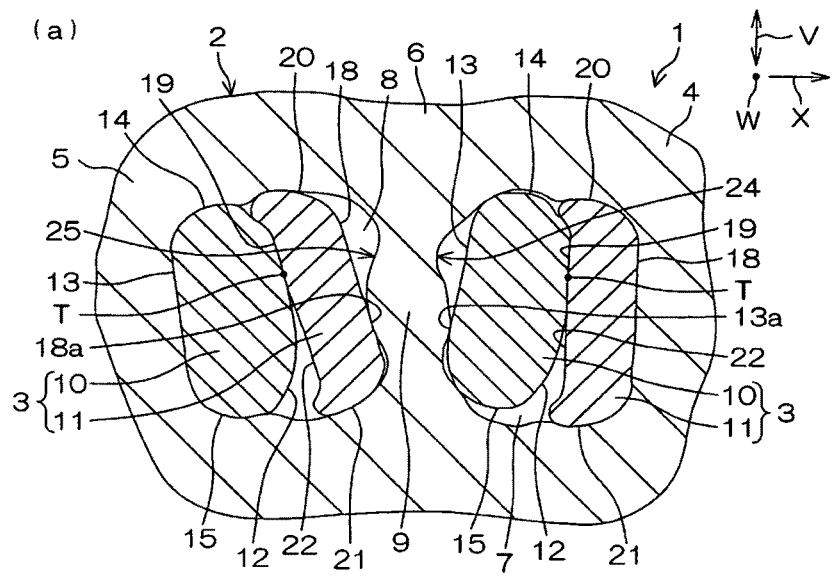
FIG. 4 Sectional views taken along the line IV-IV in FIG. 3.
Figure 4:
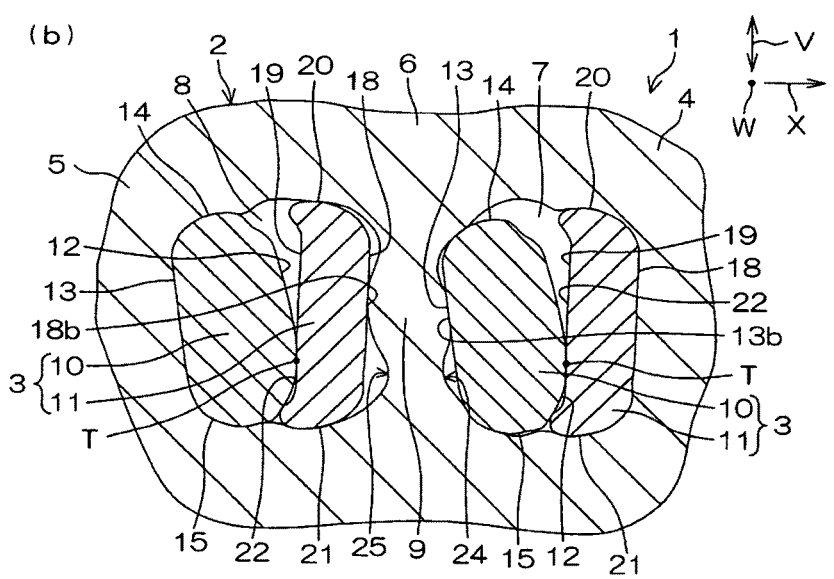

FIG. 3 is a sectional view of a main part of the chain 1. In addition, FIG. 4 shows sectional views of the chain taken along the line IV-IV in FIG. 3. FIG. 3 shows a straight-line area of the chain 1. In FIG. 4, (a) shows a state in which a turning of the chain 1 towards a positive side (a designed turning direction of the chain 1) becomes the largest in design and (b) shows a state in which a turning of the chain 1 towards a negative side (an opposite direction to the designed turning direction of the chain 1) becomes the largest in design.

Referring to FIGS. 3 and 4, the chain 1 includes a plurality of links 2 and a plurality of connecting members 3 which connect the links 2 so as to turn relative to each other. Hereinafter, a direction extending along a traveling direction of the chain 1 is referred to as a chain traveling direction X, a direction which is vertical to the chain traveling direction X and which extends along a longitudinal direction of the connecting member is referred to as a chain width direction W, and a direction which is vertical to both the chain traveling direction X and the chain width direction W is referred to as a vertical direction V.

Each link 2 is a plate-like member of a steel plate which is formed generally into a rectangular shape. The links 2 are arranged to be aligned in the chain traveling direction X while being aligned side by side in the chain width direction W to thereby form a plurality of rows of links. The links 2 which lie adjacent in the chain traveling direction X are connected together by the connecting member 3 so as to turn relative to each other. In this embodiment, links of the same kind (short-pitch links, which will be described later) are used as the respective links 2, and respective shapes of the links 2 are made substantially the same. In addition, an outer circumferential shape of each link 2 is formed by a smooth curvilinear line, which is a shape making difficult the occurrence of stress concentration.

As is shown in FIG. 4, each link 2 includes a front end portion 4 and a rear end portion 5 which are aligned at the front and rear in the chain traveling direction X, as well as an intermediate portion 6 which is disposed between the front end portion 4 and the rear end portion 5. A front through hole 7 is formed as a first through hole at the front end portion 4, and a rear through hole 8 is formed as a second through hole at the rear end portion 5. The front through hole 7 and the rear through hole 8 are aligned at the front and rear in the chain traveling direction X. In addition, the intermediate portion 6 has a pillar portion 9 which separates the front through hole 7 and the rear through hole 8 from each other. This pillar portion 9 has a predetermined thickness in the chain traveling direction X.

As is shown in FIG. 3, in links 2 which lie adjacent in the chain traveling direction X, a front through hole 7 in a link 2 lying relatively rearwards in the chain traveling direction X and a rear through hole 8 in a link 2 lying relatively forwards in the chain traveling direction X are aligned side by side in the chain width direction W so as to correspond. The links 2 which lie adjacent in the chain traveling direction X are connected together so as to turn relative to each other by a connecting member 3 which extends through the corresponding through holes 7, 8. By dosing so, the chain 1 is formed which has an endless shape as a whole.

Each connecting member 3 includes a first pin 10 as a first power transmission member and a second pin 11 as a second power transmission member which makes a pair with the first pin 10. These first and second pins 10, 11 which make the pair are fitted in the same through hole (the front through hole 7 or the rear through hole 8) which corresponds, and the second pin 11 is disposed on a front side with respect to the chain traveling direction X. In addition, the first and second pins 10, 11 which make the pair are designed to be brought into oscillating sliding contact with each other as the corresponding links 2 turn relative to each other. The oscillating sliding contact is referred to as a contact state which includes at least one of an oscillating contact and a sliding contact.

Referring to FIG. 4, the first pin 10 is a long (plate-like) member which extends in the chain width direction W. A circumferential surface of the first pin 10 extends parallel to the chain width direction W. The circumferential surface of the first pin 10 has a front portion 12 as a confronting portion which is oriented forwards in the chain traveling direction X, a rear portion 13 as a back portion which is oriented rearwards in the chain traveling direction X and one end portion 14 and the other end portion 15 as a pair of end portions which confront in the vertical direction V.

In section the front portion 12 is formed by a smooth curve and confronts the second pin 11 with which the first pin 10 makes the pair. The front portion 12 is in oscillating sliding contact with the second pin 11 at a contact portion T. The front portion 12 can be regarded as a portion of the first pin 10 which contacts the second pin 11 with which the first pin 10 makes the pair. The rear portion 13 is formed into a flat plane.

The one end portion 14 makes up an end portion of the circumferential surface of the first pin 10 which lies at an end facing a chain outer circumferential side (one of ends in the vertical direction V) and is formed into a curved surface which is convexly curved towards the chain outer circumferential side. In addition, the other end portion 15 makes up an end portion of the circumferential surface of the first pin 10 which lies at an end facing a chain inner circumferential side (the other of the ends in the vertical direction V) and is formed into a curved surface which is convexly curved towards the chain inner circumferential side.

Hereinafter, of the sides in the vertical direction, the side which is oriented from the one end portion 14 towards the other end portion 15 is referred to as the chain inner circumferential side, while the side which is oriented from the other end portion 15 towards the one end portion 14 is referred to as the chain outer circumferential side.

Referring to FIGS. 2 and 3, a pair of end portions 16, 17 with respect to a longitudinal direction (the chain width direction W) of the first pin 10 project in the chain width direction W from links 2 which are disposed at a pair of end portions in the chain width direction W, respectively. End faces 16a, 17a, which function as power transmission portions, are provided at the pair of end portions 16, 17, respectively. The pair of end faces 16a, 17a confront each other with a plane vertical to the chain width direction W held therebetween and have a symmetrical shape with each other. These end faces 16a, 17a are intended to be brought into frictional contact (engagement) with the corresponding half pulley surfaces 62a, 63a, 72a, 73a of the respective pulleys 60, 70 via a lubricant film.

The first pin 10 is held between the pair of half pulley surfaces (the half pulley surface 62a and the half pulley surface 63a or the half pulley surface 72a and the half pulley surface 73a), whereby power is transmitted between the first pulley 10 and each pulley 60, 70. Since the end faces 16a, 17a of the first pin 10 directly contribute to the transmission of power, the first pin 10 is formed of a high strength wear resistant material such as a bearing steel (SUJ), for example.

The end faces 16a, 17a of the first pin 10 are formed into a shape which contains part of a spherical surface, for example, and are convexly curved outwards in the chain width direction W. In addition, as is shown in FIG. 2, the one end portion 14 of the first pin 10 is formed longer in the chain width direction W (wider) than the other end portion 15, whereby the end faces 16a, 17a are oriented towards the chain inner circumferential side. When looked at from the chain width direction W, the positions of apex portions of the end faces 16a, 17a coincide with diagrammatic centers of the end faces 16a, 17a.

Referring to FIGS. 3 and 4, the second pin 11 (also referred to as a strip or an inter-piece) is a long (plate-like) member which is formed of the same material as that of the first pin 10 and which extends in the chain width direction W. As is shown in FIG. 3, the second pin 11 is formed shorter than the first pin 10, so that a pair of end portions thereof is made not to contact the respective half pulley surfaces 62a, 63a, 72a, 73a of the pulleys 60, 70. The second pin 11 is formed thinner than the first pin 10 with respect to the chain traveling direction X.

A circumferential surface of the second pin extends in the chain width direction W. As is shown in FIG. 4, The circumferential surface of the second pin 11 has a front portion 18 which is oriented forwards in the chain traveling direction X, a rear portion 19 as a confronting portion which is oriented rearwards in the chain traveling direction X and one end portion 20 and the other end portion 21 as a pair of end portions with respect to the vertical direction V.

The rear portion 19 has a flat portion 22. This rear portion 19 confronts the front portion 12 of the first pin 10 with which the second pin 11 makes the pair and is in oscillating sliding contact with the front portion 12 at the contact portion T. The front portion 18 is formed into a flat plane which is generally parallel to the flat portion 22 of the rear portion 19. The one end portion 20 makes up an end portion of the circumferential surface of the second pin 11 which lies at an end facing the chain outer circumferential side and is formed into a curved surface which is convexly curved towards the chain outer circumferential side. In addition, the other end portion 21 makes up an end portion of the circumferential surface of the second pin 11 which lies at an end facing the chain inner circumferential side and is formed into a curved surface which is convexly curved towards the chain inner circumferential side.

The chain 1 is a chain of a so-called press-fit type. Specifically, the first pin 10 is loosely fitted in the front through hole 7 in each link 2 so that a relative movement thereof is permitted and is press fitted in the rear through hole 8 in each link 2 so that the relative movement is restricted. In addition, the second pin 11 is press fitted in the front through hole 7 in each link 2 so that a relative movement thereof is restricted and is loosely fitted in the rear through hole 8 in each link so that the relative movement is permitted.

In other words, in the front through hole 7 in each link 2, the first pin is loosely fitted so that the relative movement thereof is permitted and the second pin 11, which makes the pair with the first pin 10, is press fitted so that the relative movement thereof is restricted. In addition, in the rear through hole 8 in each link 2, the first pin 10 is press fitted so that the relative movement thereof is restricted and the second pin 11, which makes the pair with the first pin 10, is loosely fitted so that the relative movement thereof is permitted.

By this configuration, the front portion 12 of the first pin 10 and the rear portion 19 of the second pin 11, which makes the pair with the first pin 10, are allowed to be brought into oscillating sliding contact with each other as the links 2 which lie adjacent in the chain traveling direction X turn relative to each other.

As is shown in FIG. 3, the chain 1 has a predetermined connecting pitch P. The connecting pitch P means a distance between the adjacent first pins 10, 10 in a straight-line area of the chain 1. Specifically, the predetermined connecting pitch P means a distance in the chain traveling direction X between the contact portion T between the first and second pins 10, 11 in the front through hole 7 in the link 2 and the contact portion T between the first and second pins 10, 11 in the rear through hole 8 in the same link 2 in the straight-line area of the chain 1.

Figure 5:
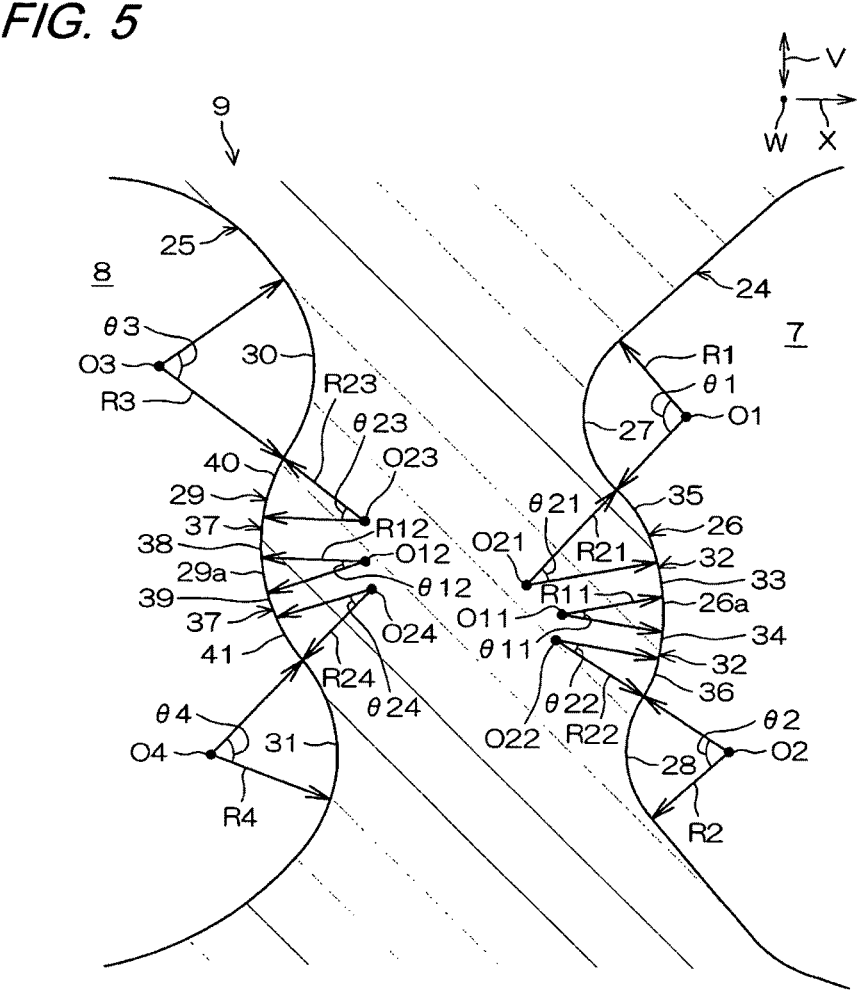
FIG. 5 An enlarged view of a pillar portion of a link.

FIG. 5 is an enlarged view of the pillar portion 2 of the link 2. Referring to FIG. 5, the pillar portion 9 of each link 2 has a shape which constricts at both end portions with respect to a height direction (the vertical direction V) of the pillar portion 9 and swells out at a central portion thereof. Namely, four concave curve portions 27, 28, 30, 31 are provided at both the end portions, and two projecting portion 26, 29 are provided at the central portion. The pillar portion 9 of each link 2 includes one side portion 24 which lies on a front through hole 7 side and the other side portion 25 which lies on a rear through hole 8 side.

Hereinafter, the shape of the pillar portion 9 will be described in detail.

The one side portion 24 includes the projecting portion 26 which projects towards the front through hole 7 side and the upper concave curve portion 27 and the lower concave curve portion 28 which function as a pair of concave curve portions which is disposed to hold the projecting portion 26 therebetween with respect to the height direction of the pillar portion 9.

A sectional shape of the upper concave curve portion 27 has, for example, a predetermined arc-like shape which is determined by a radius of curvature R1 and a center angle θ1. A curvature center O1 of the sectional shape of the upper concave curve portion 27 is disposed within the front through hole 7. In addition, a sectional shape of the lower concave curve portion 28 has a predetermined arc-like shape which is determined by a radius of curvature R2 and a center angle θ2. A curvature center O2 of the sectional shape of the lower concave curve portion 28 is disposed within the front through hole 7.

On the other hand, the other side portion 25 is formed into a substantially symmetrical shape with the one side portion 24. Namely, the other side portion 25 includes the projecting portion 29 which projects towards the rear through hole 8 side and the upper concave curve portion 30 and the lower concave curve portion 31 which function as a pair of concave curve portions which is disposed to hold the projecting portion 29 therebetween with respect to the height direction of the pillar portion 9.

A sectional shape of the upper concave curve portion 30 has, for example, a predetermined arc-like shape which is determined by a radius of curvature R3 and a center angle θ3, and a curvature center O3 of the sectional shape thereof is disposed within the rear through hole 8. In addition, a sectional shape of the lower concave curve portion 31 has, for example, a predetermined arc-like shape which is determined by a radius of curvature R and a center angle θ4. A curvature center O4 thereof is disposed within the rear through hole 8.

The radii of curvature R1, R3 of the upper concave curve portions 27, 30 and the radii of curvature R3, R4 of lower concave curve portions 28, 31 are set to a smallest value within a range of values which ensures a lower limit of a strength required for the pillar portion 9. Namely, degrees of concavity of the upper concave curve portions 27, 30 and degrees of concavity of the lower concave curve portions 28, 31 are set to a largest value within a range of values which ensures the lower limit of the strength required for the pillar portion 9.

The weight of each link 2 is reduced by providing the concave curve portions 27, 28, 30, 31 at the pillar portion 9 of the link 2. By dosing so, the weight of the chain 1 is reduced. In addition, in the embodiment, since the radii of curvature R1, R3 of the upper concave curve portions 27, 30 and the radii of curvature R2, R4 of the lower concave curve portions 28, 31 are set to the smallest values within the aforesaid range, the weight of each link 2 is reduced further.

On the one side portion 24 of each pillar portion 9, flat portions 33, 34 are formed, respectively, on a pair of inclined surfaces 32, 32 which hold an apex portion 26a of the projecting portion 26 therebetween which flat portions 33, 34 are brought into abutment with corresponding surfaces of the corresponding power transmission member (the first pin 10) when a turning angle between the links 2 is restricted. Namely, of the pair of inclined surfaces 32, 32, the upper flat portion 33 is formed on the upper inclined surface 32 and the lower flat portion 34 is formed on the lower inclined surface 32. A sectional shape of the apex portion 26a is formed into, for example, a predetermined arc-like shape which is determined by a radius of curvature R11 and a center angle θ11. A curvature center O11 of the sectional shape of the apex portion 26a is disposed within the pillar portion 9.

On the one side portion 24 of each pillar portion 9, the upper flat portion 33 and the upper concave curve portion 27 are connected smoothly by an upper convexly curved portion 35. In addition, on the one side portion 24 of each pillar portion 9, the lower flat portion 34 and the lower concave curve portion 28 are connected smoothly by a lower convexly curved portion 36.

A sectional shape of the upper convexly curved portion 35 is formed into, for example, a predetermined arc-like shape which is determined by a radius of curvature R21 and a center angle θ21. A curvature center O21 of the sectional shape of the upper convexly curved portion 35 is disposed within the pillar portion 9. In addition, a sectional shape of the lower convexly curved portion 36 is formed into, for example, a predetermined arc-like shape which is determined by a radius of curvature R22 and a center angle θ22. A curvature center O22 of the sectional shape of the lower convexly curved portion 36 is disposed within the pillar portion 9.

On the other hand, on the other side portion 25 of each pillar portion 9, an upper flat portion 38 and a lower flat portion 39 are formed, respectively, on a pair of inclined surfaces 37, 37 which hold an apex portion 29a of the projecting portion 29 therebetween which upper and lower flat portions 38, 39 are brought into abutment with corresponding surfaces of the corresponding power transmission member (the second pin 11) when a turning angle between the links 2 is restricted. A sectional shape of the apex portion 29a is formed into, for example, a predetermined arc-like shape which is determined by a radius of curvature R12 and a center angle θ12, and a curvature center O12 thereof is disposed within the pillar portion 9.

On the other side portion 25 of each pillar portion 9, the upper flat portion 38 and the upper concave curve portion 30 are connected smoothly by an upper convexly curved portion 40. In addition, on the other side portion 25 of each pillar portion 9, the lower flat portion 39 and the lower concave curve portion 31 are connected smoothly by a lower convexly curved portion 41.

A sectional shape of the upper convexly curved portion 40 is formed into, for example, a predetermined arc-like shape which is determined by a radius of curvature R23 and a center angle θ23. A curvature center O23 of the sectional shape of the upper convexly curved portion 40 is disposed within the pillar portion 9. In addition, a sectional shape of the lower convexly curved portion 41 is formed into, for example, a predetermined arc-like shape which is determined by a radius of curvature R24 and a center angle θ24. A curvature center O24 of the sectional shape of the lower convexly curved portion 41 is disposed within the pillar portion 9.

The one side portion 24 of each pillar portion 9 is designed not to interrupt the oscillating motion of the first pin 10 which is loosely fitted in the front through hole 7 to which the one side portion 24 corresponds (the turning between the links 2 to which the first pin 10 corresponds). In addition, the other side portion 25 of each pillar portion 9 is designed not to interrupt the oscillating motion of the second pin 11 which is loosely fitted in the rear through hole 8 to which the other side portion 25 corresponds (the turning between the links 2 to which the second pin 11 corresponds).

In addition, the one side portion 24 of each pillar portion 9 is designed to be brought into contact with the first pin 10 when the turning angle between the links 2 to which the first pin 10 corresponds reaches a permissible value (when the turning angle reaches a largest turning angle in design) so as to restrict a further turning (an overshoot). Similarly, the other side portion 25 of each pillar portion 9 is designed to be brought into contact with the second pin 11 when the turning angle between the links 2 to which the second pin 11 corresponds reaches a permissible value (when the turning angle reaches a largest turning angle in design) so as to restrict a further turning (an overshoot).

Specifically, as is shown in FIG. 4(a), in such a state that a turning of the chain 1 towards the positive side becomes largest in design, part 13a of the rear portion 13 of the first pin 10 which is loosely fitted in the front through hole 7, which part functions as the "corresponding surface of the corresponding power transmission member," is in abutment with the lower flat portion 34 of the one side portion 24, while part 18a of the front portion 18 of the second pin 11 which is loosely fitted in the rear through hole 8, which part functions as the "corresponding surface of the corresponding power transmission member," is in abutment with the lower flat portion 39 of the other side portion 25. In such a state in which the turning of the chain 1 towards the positive side becomes largest, the turning between the links 2 is restricted by the pair of lower flat portions 34, 39.

In addition, as is shown in FIG. 4(b), in such a state that a turning of the chain 1 towards the negative side becomes largest in design, part 13b of the rear portion 13 of the first pin 10 which is loosely fitted in the front through hole 7, which part functions as the "corresponding surface of the corresponding power transmission member," is in abutment with the upper flat portion 33 of the one side portion 24 of each pillar portion 9, while part 18b of the front portion 18 of the second pin 11 which is loosely fitted in the rear through hole 8, which part functions as the "corresponding surface of the corresponding power transmission member," is in abutment with the upper flat portion 38 of the other side portion 25 of each pillar portion 9. In such a state in which the turning of the chain 1 towards the negative side becomes largest, the turning between the links 2 is restricted by the pair of upper flat portions 33, 38.

In this embodiment, since the upper flat portions 33, 38 and the lower flat portions 34, 39 are provided only in proximity to the central portion in the height direction of the pillar portion 9, shocks resulting when the rear portion 13 of the first pin 10 and the front portion 18 of the second pin 11 individually impact the corresponding flat portions 33, 34, 38, 39 are reduced.

Namely, the parts 18a, 18b of the front portion 18 and the parts 13a, 13b of the rear portion 13 which function as the "corresponding surface of the corresponding power transmission member" constitute portions where a speed at which the first pin 10 and the second pin 11 move when they make an oscillating motor is slow, and the shocks can be reduced by bringing these portions into abutment with the corresponding flat portions 33, 34, 38, 39. By doing so, abnormal noise produced when the turning between the links 2 is restricted is reduced.

In addition, in the embodiment, the shocks by the impact can be absorbed by the pillar portion 9 being deflected when the rear portion 13 of the first pin 10 and the front portion 18 of the second pin 11 impact their corresponding flat portions 33, 34, 38, 39. Namely, since the concave curve portions 27, 28, 30, 31 are provided at the pillar portion 9 of each link 2, the rigidity of the pillar portion 9 of each link 2 is reduced compared with a pillar portion where such concave curve portions 27, 28, 30, 31 are not provided. Consequently, the pillar portion 9 is deflected at portions which correspond to the flat portions 33, 34, 38, 39 when the rear portion of the first pin 10 and the rear portion 18 of the second pin 11 individually impact their corresponding flat portions 33, 34, 38, 39, whereby the shocks by the impact can be made to be absorbed by the pillar portion 9. By doing so, noise produced when the turning between the links 2 is reduced further.

Further, in the embodiment, as has been described above, the degree of concavity of the upper concave curve portions 27, 30 and the lower concave curve portions 28, 31 can be increased by providing the upper convexly curved portions 35, 40 and the lower convexly curved portions 36, 41.

Figure 6:
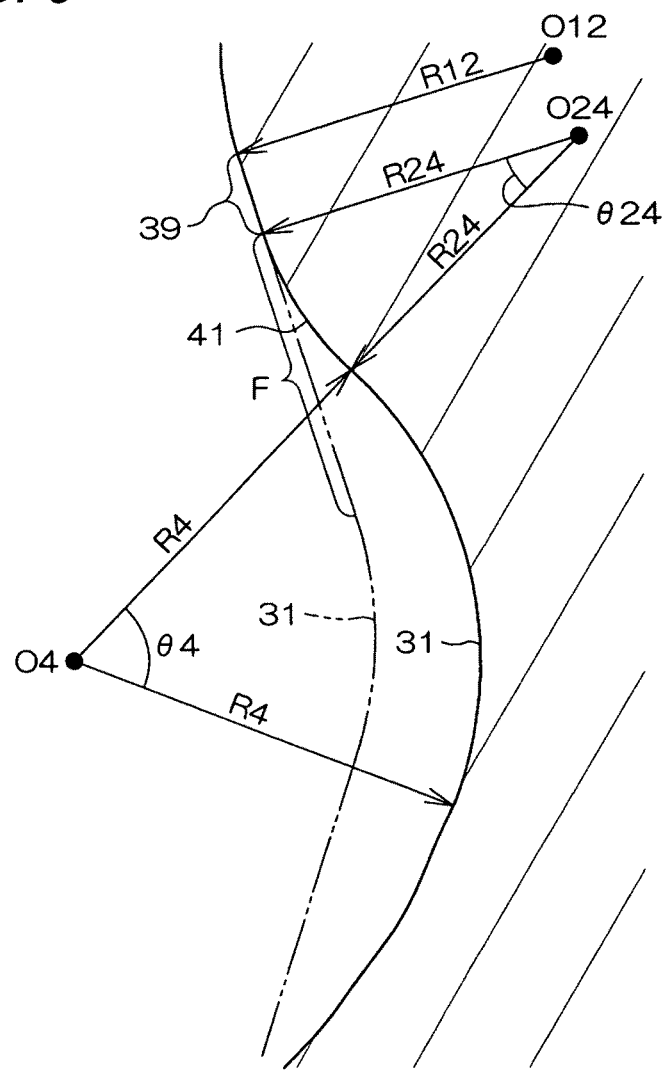
FIG. 6 An enlarged view of part of FIG. 5.

This will be described by taking the lower convexly curved portion 41 for example by reference to FIG. 6 showing part of FIG. 5 in an enlarged fashion. For example, in the event that the lower flat portion 39 and the lower concave curve portion 31 are connected smoothly by a flat portion F, a shape results which is indicated by a chain double-dashed line in FIG. 6, and it becomes difficult to increase the degree of concavity of the lower concave curve portion 31.

On the other hand, when the lower flat portion 39 and the lower concave curve portion 31 are connected by the lower convexly curved portion 41, the degree of concavity of the lower concave curve portion 31 can be increased as is seen by comparing a shape indicated by a solid line with the shape indicated by the chain double-dashed line in FIG. 6.

By increasing the degree of concavity in the upper concave curve portions 27, 30 and the lower concave curve portions 28, 31, the first pin 10 and the second pin 11 can be brought into abutment with their corresponding flat portions 33, 34, 38, 39 in an ensured fashion. By doing so, abnormal noise produced when the turning between the links 2 is restricted is reduced in an ensured fashion. In addition, by increasing the degree of concavity, the reduction in weight of each link 2 is attained in an ensured fashion.

Furthermore, in this embodiment, wear of the first and second pins 10, 11 can be reduced which would otherwise be caused by insufficient lubrication by allowing a lubricant to stay at the concave curve portions 27, 28, 30, 31 through providing the concave curve portions 27, 28, 30, 31 at the pillar portion 9 of each link 2.

Figure 7:
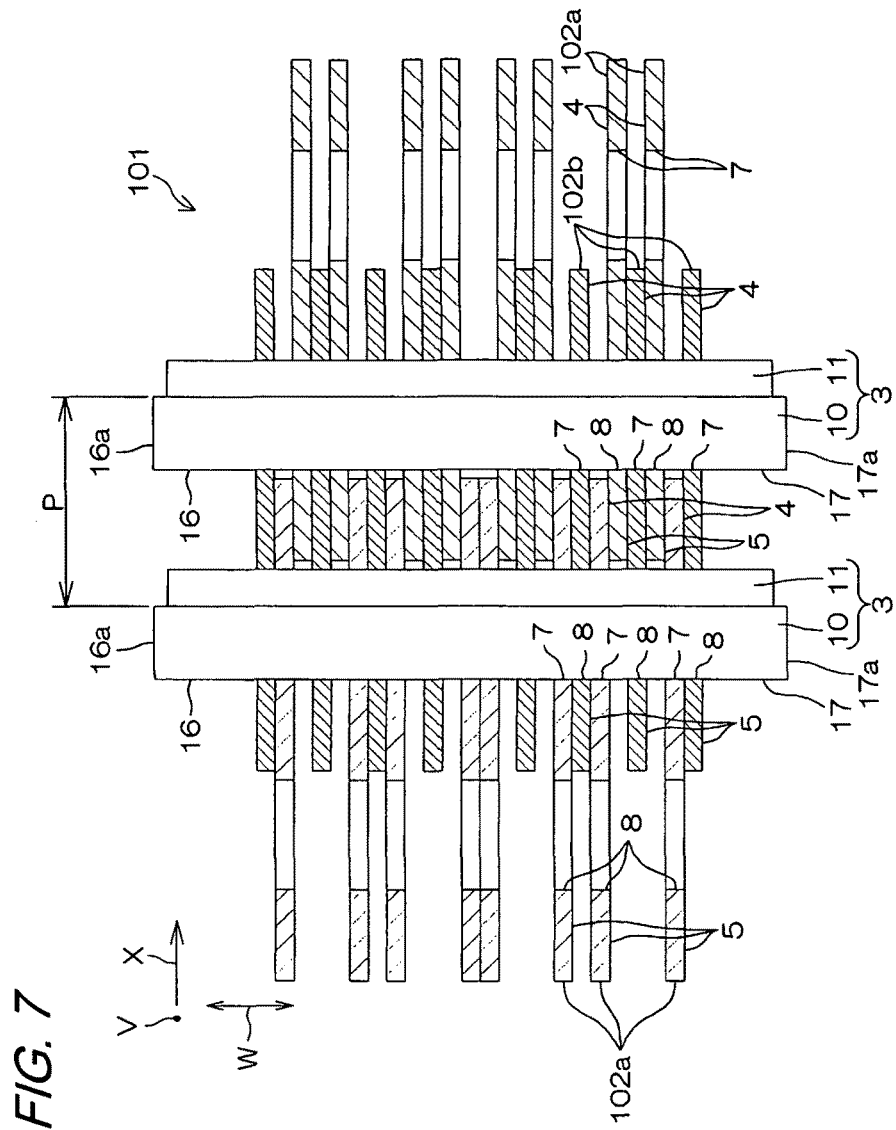
FIG. 7 A sectional view of a main part of a chain according to a different embodiment of the invention.
Figure 8:
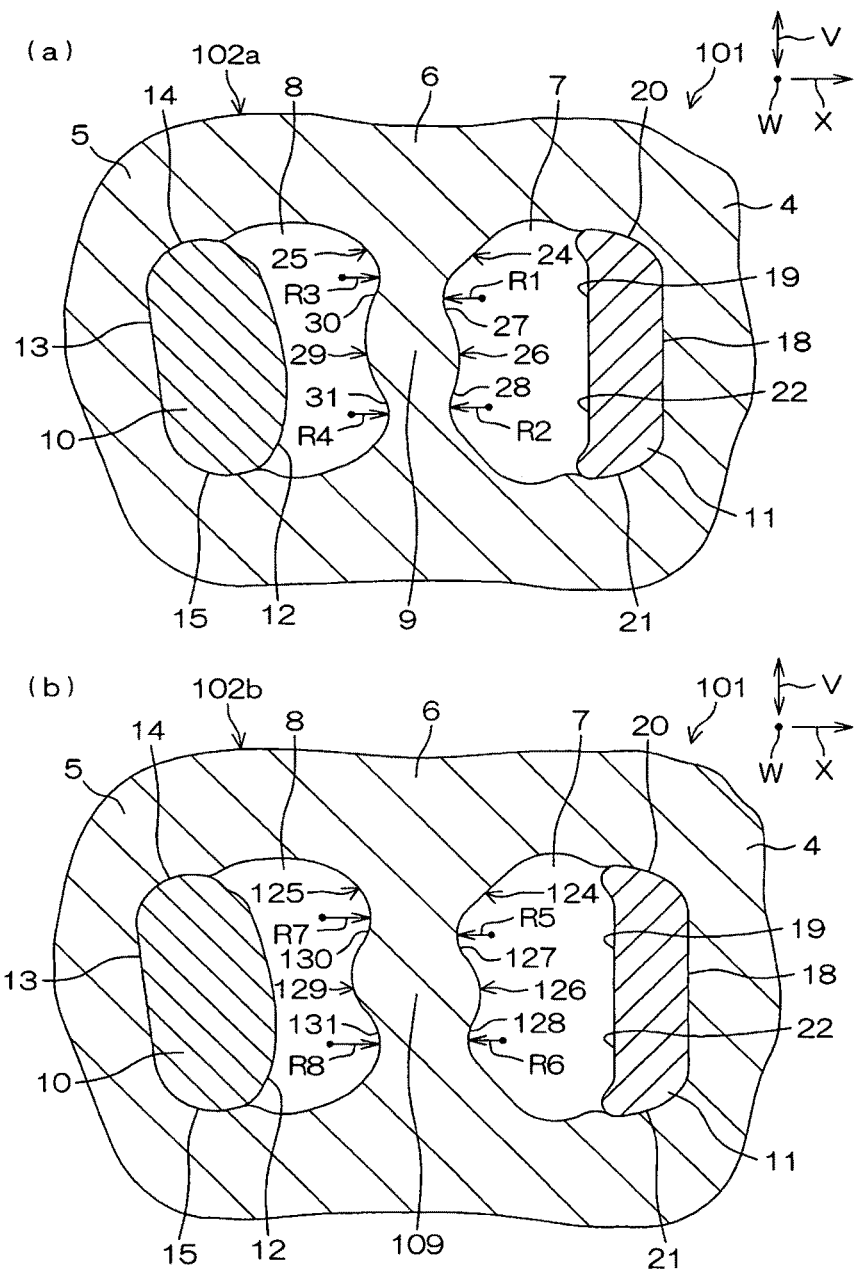
FIG. 8 Plan views of a short-pitch link and a long-pitch link which make up the chain according to the different embodiment of the invention.

FIG. 7 is a sectional view of a main part of a chain 101 according to a different embodiment of the invention. In addition, FIG. 8 shows plan views of a short-pitch link 102*a* and a long-pitch link 102*b* which make up the chain 101 according to the different embodiment of the invention. In FIG. 8, (a) shows a plan view of the short-pitch link 102*a* which has a relatively short connecting pitch P, and (b) shows a plan view of the long-pitch link 102*b* which has a relatively long connecting pitch P. The short-pitch link 102*a* shown in FIG. 8(*a*) is such as to be used as the link 2 in the aforesaid embodiment. Consequently, in this embodiment, the long-pitch link 102*b* will be described in detail. In addition, in FIGS. 7 and 8, like reference numerals to those used in FIGS. 1 to 6 will be given to constituent portions which are like to the respective portions shown in FIGS. 1 to 6, and the description thereof will be omitted.

Referring to FIGS. 7 and 8, the chain 101 according to this embodiment differs from the chain 1 of the previous embodiment in that the long-pitch link 102*b* having the relatively long connecting pitch P and the short-pitch link 102 having the relatively short connecting pitch P are used as links which make up the chain 101.

As is shown in FIG. 8, the long-pitch link 102*b* is, for example, a plate-like member which is made of a steel plate and which has generally the same shape as that of the short-pitch link 102*a*. Namely, the long-pitch link 102*b* differs from the short-pitch link 102*a* only in the shape of a pillar portion 109, and the long-pitch link 102*b* is identical to the short-pitch link 102*a* in the other portions. With respect to a height direction (a vertical direction V) of the pillar portion 109, four concave curve portions 127, 128, 130, 131 are provided at both end portions of the pillar portion 109 of the long-pitch link 102*b* and two projecting portions 126, 129 are provided at a central portion thereof.

In addition, as is shown in FIG. 7, short-pitch links 102*a* and long-pitch links 102*b* are individually aligned side by side in a chain width direction W to thereby form rows. Links in the same row are made up of the links of the same type (short-pitch links 102 or long-pitch links 102*b*).

Rows made up of the short-link pitches 102*a* and rows made up of the long-pitch links 102*b* are disposed at random to be aligned in a chain traveling direction X. For example, rows made up of the short-link pitches 102*a* and rows made up of the long-pitch links 102*b* are disposed to be aligned alternately in the chain traveling direction X. Links lying adjacent in the chain traveling direction are connected together by a connecting member 3 so as to turn relative to each other. By doing so, the chain 101 having an endless shape is made up.

As is shown in FIG. 8(*b*), the long-pitch link 102*b* includes a front end portion 4 and a rear end portion 5 which are aligned front and rear in the chain traveling direction X and an intermediate portion 6 which is disposed between the front end portion 4 and the rear end portion 5. A front through hole 7 is formed in the front end portion 4, and a rear through hole 8 is formed in the rear end portion 5. In addition, the intermediate portion 6 has the pillar portion 109 which separates the front through hole 7 from the rear through hole 8. The pillar portion 9 has a predetermined thickness in the chain traveling direction X.

In FIG. 8, as is seen from a comparison between a diagram shown at (a) and a diagram shown at (b), with respect to the height direction of the pillar portion 109, thicknesses of the long-pitch link 102*b* at respective heights are made larger than thicknesses of a pillar portion 9 of the short-pitch link 102*a* at corresponding heights.

The pillar portion 109 of the long-pitch link 102*b* includes one side portion 124 which constitutes a side portion on a front through hole 7 side and the other side portion 125 which constitutes a side portion on a rear through hole 8 side. The one side portion 124 includes the projecting portion 126 which projects towards the front through hole 7 side at the central portion with respect to the height direction of the pillar portion 109 and an upper concave curve portion 127 and a lower concave curve portion 128 which function as a pair of concave curve portions which is disposed so as to hold the projecting portion 126 therebetween with respect to the height direction of the pillar portion 109.

The upper concave curve portion 127 has, for example, an arc-like shape which is determined by a radius of curvature R5 and a predetermined center angle, and a curvature center thereof is disposed within the front through hole 7. In addition, the lower concave curve portion 128 has, for example, an arc-like shape which is determined by a radius of curvature R6 and a predetermined center angle, and a curvature center thereof is disposed within the front through hole 7.

In addition, although not shown, an upper flat portion 33 and a lower flat portion 34 are provided at the projecting portion 126 for restricting an overshoot of the chain 101. Similarly, although not shown, the upper flat portion 34 and the upper concave curve portion 127 are connected by an upper convexly curved portion 35, and the lower flat portion 34 and the lower concave curve portion 128 are connected by a lower convexly curved portion 36.

On the other hand, the other side portion 125 has a generally symmetrical shape with the one side portion 124. Namely, the other side portion 125 includes the projecting portion 129 which projects towards the rear through hole 8 side at the central portion with respect to the height direction of the pillar portion 109 and an upper concave curve portion 130 and a lower concave curve portion 131 which function as a pair of concave curve portions which is disposed so as to hold the projecting portion 129 therebetween with respect to the height direction of the pillar portion 109.

The upper concave curve portion 130 has, for example, an arc-like shape which is determined by a radius of curvature R7 and a predetermined center angle, and a curvature center thereof is disposed within the rear through hole 8. In addition, the lower concave curve portion 131 has, for example, an arc-like shape which is determined by a radius of curvature R8 and a predetermined center angle, and a curvature center thereof is disposed within the rear through hole 8.

Although not shown, an upper flat portion 38 and a lower flat portion 39 are provided at the projecting portion 129 for restricting an overshoot of the chain 101. Similarly, although not shown, the upper flat portion 38 and the upper concave curve portion 130 are connected by an upper convexly curved portion 40, and the lower flat portion 34 and the lower concave curve portion 131 are connected by a lower convexly curved portion 41.

The radii of curvature R5, R7 of the upper concave curve portions 127, 130 and the radii of curvature R6, R8 of the lower concave curve portions 128, 131 are set to a smallest value of a range of values which ensures a lower limit of a strength required for the pillar portion 109. Namely, degrees of concavity of the upper concave curve portions 127, 130 and degrees of concavity of the lower concave curve portions 128, 131 are set to a largest value within a range of values which ensures the lower limit of the strength required for the pillar portion 109.

When comparing the radii of curvature R1 to R8 in the corresponding positions of the short-pitch link 102a and the long-pitch link 102b (when comparing R1 with R5, R2 with R6, R3 with R7 and R4 with R8), the radii of curvature of the concave curve portions in relation to the long-pitch link 102b are made smaller than the radii of curvature of the concave curve portions in relation to the short-pitch link 102a to such an extent that the difference can be identified visually (relationships R1>R5, R2>R6, R3>R7, R4>R8 are established).

Namely, since the thickness of the pillar portion 109 of the long-pitch link 102b is made larger than the thickness of the pillar portion 9 of the short-pitch link 102a, the strength of the pillar portion 109 of the long-pitch link 102b is higher than that of the pillar portion 109 of the short-pitch link 102a, as a result of which even in the event that the radii of curvature of the concave curve portions in relation to the long-pitch link 102b are made smaller than the radii of curvature of the concave curve portions in relation to the short-pitch link, the pillar portion 109 of the long-pitch link 2 is allowed to have a lower limit of the strength required therefor.

The weight of each long-pitch link 102 is reduced by providing the concave curve portions 127, 128, 130, 131 at the pillar portion 109 of the long-pitch link 102b. By doing so, a reduction in weight of the chain 101 is attained. In addition, since the radii of curvature of the concave curve portions in relation to the long-pitch line 102b are made smaller than the radii of curvature of the concave curve portions in relation to the short-pitch link 102a, the weight of the long-pitch link 102b is made lighter than the weight of the short-pitch link 102a.

In addition, in this embodiment, since the radii of curvature of the concave curve portions in relation to the long-pitch link 102b are made shorter than the radii of curvature of the concave curve portions in relation to the short-pitch link 102a to such an extent that the difference can be identified visually, the long-pitch link 102b can visually be discriminated from the short-pitch link 102a based on the difference in size between the long-pitch link 102b and the short-pitch link 102a. By this, for example, an erroneous assemblage can be prevented in which the short-pitch link 102a is disposed in a position where the long-pitch link 102b is to be disposed.

Thus, the embodiments of the invention have been described heretofore, the invention is not limited to the respective embodiments. Namely, various alterations in design can be made within a range of matters that are described in claims of the invention.

INDUSTRIAL APPLICABILITY

According to the invention, the power transmission chain can be provided which can reduce abnormal noise.

The invention claimed is:

1. A power transmission chain link comprising a link having a first through hole and a second through hole formed therein and a pillar formed between the first through hole and the second through hole, the pillar comprising a first side portion and a second side portion, the first side portion facing the first through hole and the second side portion facing the second through hole, the pillar comprising:
   a first concave portion provided on a first side portion of the pillar;
   a second concave portion provided on the first side portion of the pillar;
   a third concave portion provided on a second side portion of the pillar;
   a fourth concave portion provided on the second side portion of the pillar;
   a first projecting portion provided at a center portion of the pillar, the first projecting portion protruding towards the first through hole and positioned between the first concave portion and the second concave portion with respect to a height direction of the pillar portion;
   a second projecting portion provided at the center portion of the pillar, the second projecting portion protruding towards the second through hole and positioned between the third concave portion and the fourth concave portion with respect to the height direction of the pillar portion;
   a first upper flat portion and a first lower flat portion formed, respectively, on a pair of first inclined surfaces which hold an apex portion of the first projecting portion therebetween, the first upper flat portion being formed on an upper surface of the pair of first inclined surface and the first lower flat portion being formed on a lower surface of the pair of first inclined surfaces; and
   a second upper flat portion and a second lower flat portion formed, respectively, on a pair of second inclined surfaces which hold an apex portion of the second projecting portion therebetween, the second upper flat portion being formed on an upper surface of the pair of second inclined surface and the second lower flat portion being formed on a lower surface of the pair of second inclined surfaces.

2. A power transmission chain comprising at least one of the power transmission chain links according to claim 1, and further comprising:
   a plurality of first pins, said first pins each comprising a front portion oriented towards a forward chain travel direction and a rear portion; and
   a plurality of second pins, said second pins each comprising a front portion oriented towards the forward chain travel direction and a rear portion, to be combined with the one of the first pins as a power transmission pair, a respective power transmission pair being provided in each of the first through hole and the second through hole of a respective power transmission chain link.

3. A power transmission chain according to claim 2, wherein, in the first through hole, the rear portion of the second pin comprises a flat portion and is configured to confront the front portion of the first pin in an oscillating contact at a contact portion as the power transmission pair is formed.

4. A power transmission chain according to claim 3, wherein, in the second through hole, the front portion of the second pin comprises a flat plane which is parallel to the rear portion of the first pin as the power transmission pair is formed.

5. A power transmission chain according to claim 3, wherein the first side portion of the pillar is configured to allow the oscillating contact of the first pin in the first through hole by receiving an upper portion of the first pin in the first concave portion and a lower portion of the first pin in the second concave portion during an oscillation of the first pin and the second side portion is configured to allow the oscillating motion of the respective second pin in the second through hole by receiving an upper portion of the second pin in the third concave portion and a lower portion of the second pin in the fourth concave portion during an oscillation of the second pin.

6. A power transmission chain according to claim 1, wherein the first side portion of the pillar is configured to be brought into contact with the first pin when a turning angle between the respective links to which the first pin corresponds reaches a permissible predetermined value to restrict a further turning and the second side portion of the pillar is configured to be brought into contact with the second pin when the turning angle between the respective links to which the second pin corresponds reaches a predetermined permissible value to restrict a further turning.

7. The power transmission chain link according to claim 1, wherein said first upper flat portion and said first concave portion are smoothly connected by a first upper convexly curved portion and said first lower flat potion and said second concave portion are smoothly connected by a first lower convexly curved portion.

8. The power transmission chain link according to claim 1, wherein the second upper flat portion and the third concave portion are connected smoothly by a second upper convexly curved portion and the second lower flat portion and the fourth concave portion are connected smoothly by a second lower convexly curved portion.

9. The power transmission chain link according to claim 2, wherein the first pin is loosely fitted inside the first through hole to permit a relative motion thereof therein or press fitted into the second through hole to restrict a relative motion thereof therein, and wherein the second pin is press fitted inside the first through hole to restrict a relative motion thereof therein.

10. A power transmission chain comprising a plurality of said links according to claim 1, said plurality of links including a long-pitch link having a relatively long connecting pitch and a short-pitch link having a relatively short connecting pitch, and wherein radii of curvature of concave curve portions of a pillar portion of the long-pitch link are made smaller than radii of curvature of concave curve portions of a pillar portion of the short-pitch link.

* * * * *